United States Patent Office 3,795,522
Patented Mar. 5, 1974

3,795,522
PREPARATION OF AQUEOUS REDISPERSIBLE GELS OR STABLE DILUTABLE SOLS CONTAINING TUNGSTEN AND TITANIUM AND TITANIUM-TUNGSTEN CARBIDES THEREFROM
Anthony Cecil Fox, Didcot, and Kenneth Robert Hyde, Wantage, England, assignors to United Kingdom Atomic Energy Authority, London, England
No Drawing. Filed Oct. 1, 1971, Ser. No. 185,859
Claims priority, application Great Britain, Oct. 5, 1970, 47,314/70
Int. Cl. B01j 13/00; C04b 35/56
U.S. Cl. 106—43          18 Claims

ABSTRACT OF THE DISCLOSURE

Aqueous, stable, dilutable sols and aqueous, redispersible gels having a weight ratio of $TiO_2:WO_3$ of at least 0.15 containing tungsten and titanium and optionally other metals are made by mixing freshly precipitated tungstic acid or a tungstate with an aqueous solution of a titanium salt. The sols and gels may be calcined at temperatures below 1800° C. in the presence of carbonaceous material to give mixed tungsten-titanium carbides.

PREAMBLE

The present invention relates to the manufacture of certain mixed sols and gels suitable for the preparation of mixed metal carbides. In particular, the invention provides a process for preparing a sol or gel containing tungsten and titanium (hereinafter referred to as a tungsten-titanium sol or gel), and to a method of making a mixed tungsten-titanium carbide therefrom.

Existing methods of preparation of mixed refractory metal carbides suitable for the production of hard metal products include (i) carburization of mixtures of metals, or metal oxides, with carbon,
(ii) heating mixtures of the pre-formed carbides,
(iii) a combination of methods (i) and (ii), and
(iv) production of solid solutions in a fused metal bath, e.g. tungsten and titanium (or $TiO_2$) and carbon in a nickel melt at about 2000° C.

All of those processes require the comminution and mixing together of the starting materials by conventional means, followed by heating the mixtures at temperatures usually in excess of 1800° C. The present invention falls within category (i). It is an object of this invention to provide sols and gels which can be used to make mixed metal carbides under somewhat less severe conditions than those currently employed.

The present invention provides in one aspect a sol or gel of titanium and tungsten, in which the titanium and tungsten are present in a $TiO_2/WO_3$ weight ratio of at least 0.15, and in which the molar ratio of anion/titanium is at least 1.0 divided by the valency of the anion.

In another aspect, the invention provides a process for preparing a sol or gel containing tungsten and titanium, which process comprises mixing freshly precipitated tungstic acid or a tungstate with an aqueous solution of a titanium salt so as to form the desired sol or gel. Gels so formed may be dispersed, e.g. in water, to form sols. Sols may be concentrated by evaporation to give gels.

These sols and gels are good starting materials for the preparation of mixed tungsten-titanium carbides. This is believed to be due to the fact that the tungsten and the titanium are present in the sol or gel in intimate admixture and in a specially reactive form due to the small crystallite size.

PREPARATION OF SOL AND GEL

It is known that tungstic acid exists in two forms; a stable yellow form, known as $\alpha$-tungstic acid, which may be formed by hot precipitation from tungstates and is insoluble in water; and a white form, known as $\beta$-tungstic acid, which may be formed by cold precipitation from tungstates and which goes over into the yellow form on prolonged standing or gentle warming. While we do not wish to be bound by any theory, we believe that only $\alpha$-tungstic acid is not suitable for use in the process of this invention. This belief is based on the fact that we have consistently failed to make gels using commercial tungstic acid cake as received; on the other hand, if the tungstic acid cake is dissolved, e.g. in ammonia, and reprecipitated in the acid, the resulting precipitate is suitable for the preparation of gels according to this invention.

Alternatively the ammonium tungstate may be used directly, either as a solid or in aqueous solution.

While any water-soluble titanium salt may be used, titanium tetrachloride is preferred from the standpoints of cost and availability. The concentration of the aqueous solution is not critical, and either anhydrous $TiCl_4$ or concentrated solutions which are commonly available may be used.

MIXED SOLS—GENERAL

It is advantageous to react the titanium chloride and either $\beta$-tungstic acid or a tungstate in as concentrated a state as is practicable. Too high concentrations produce viscosities of reacting mixture which may impede reaction of the constituents. Too low concentrations considerably reduce the rate of achieving sol formation and indeed some sols may not be easily prepared in too dilute a concentration.

The sols may be diluted, often infinitely diluted, with water and many inorganic aqueous solutions and also with non-aqueous liquids, e.g. alcohols, which are compatible with hydrochloric acid solutions. Precipitates will form with time from extremely weak sols.

Increasing acid, e.g. hydrochloric acid, concentrations produce opalescence, turbidity and finally precipitates. These precipitates will re-dissolve by further dilution to reduce the acid concentration. It is preferred to reduce the free acid chloride in sols to below 7 M and preferably below 4 M, although homogeneous liquids stable for short periods of time may be obtained at higher acidities of up to 12 M (see Table II).

Although an acid chloride solution is reacting with $\beta$-tungstic acid or a tungstate, the reaction is not considered to be simply the formation of more soluble metatungstate since it has been shown (see Table II below) that a quantity of titanium ions is required to achieve homogeneous sols and believed to form titano-tungstic acid complexes.

The temperature at which the initial sol or gel formation is effected is not critical, and may suitably range from 0° C. to 100° C., or even higher if an autoclave is used. Preferred temperatures lie in the range of 20° C. to 80° C. Essentially hot and cold routes of reaction produce apparently similar sols. Cold routes tend to take longer to achieve sol formation although it is not necessary to maintain as high a free acid concentration as is needed in the hot route where it is necessary to prevent hydrolysis of titanium chloride, tantalum chloride, etc. to unpeptizable hydrated oxides.

MIXED GELS—GENERAL

Some gels are clear and glassy and pass through a clear Vaseline appearance as they are diluted (e.g. with water) to produce sols.

Some gels are opalescent although produce clear sols on addition of water.

The gels are dispersed by dilution (in for example water) to convenient concentrations. Sols prepared from reactants containing lower ratios of $TiO_2/WO_3$ and lower concentrations of free acid lead to sols with higher viscosities and have a thixotropic nature.

MIXED METAL SOLS AND GELS FROM AMMONIUM TUNGSTATES

An advantage gained from the use of ammonium tungstates compared with metal tungstates as starting materials, to produce mixed metal sols and gels by reaction with titanium chloride solution, is the same as that for $\beta$-tungstic acid, namely that the resultant sols or gels may be dried to yield homogeneous mixed oxides which do not contain undesirable metals such as sodium, calcium etc.

An advantage gained by the use of ammonium tungstate as compared with $\beta$-tungstic acid is its ease of preparation. $\alpha$-Tungstic acid commonly produced during a tungsten manufacturing process may be reacted with aqueous ammonia to provide ammonium tungstates capable of reaction with titanium chloride to give mixed titanium-tungsten sols and gels.

$\alpha$-Tungstic acid may be dissolved in aqueous ammonia yielding ammonium tungstate solution which yields with titanium chloride mixed metal sols and gels. Alternatively, such an ammonium tungstate solution may be evaporated or dried to produce solid ammonium tungstates, commonly referred to as ammonium paratungstate.

The reactions between (a) titanium chloride solution and ammonium tungstate solution (A.T.S.), and (b) titanium chloride and ammonium paratungstate (A.P.T.) differ in two aspects.

Firstly for (a) the reactants are already in solution and mixture in suitable proportions (see Table II below) and give sols, where formed, in the cold after less than one hour's agitation of the slurry formed by mixing the reactants. For (b) reaction in the cold is dependent on the fineness of the A.P.T. powder and, at room temperature, takes of the order of 1 to 7 days for sol formation, while at 75° C. it needs only about 30 minutes.

Secondly the difference between (a) and (b) is in the considerably higher ammonia-tungsten ratio of A.T.S. relative to A.P.T. For our A.T.S. material there are 16 milliequivalents of $NH_3$ per gram of $WO_3$ while for A.P.T. there are 3.2 milliequivalents $NH_3$ per gram of $WO_3$. Thus for mixed sols prepared from A.T.S. and containing low ratios of $TiO_2/WO_3$ it may be necessary to add extra acid (HCl) to the system to maintain the necessary acidity. It is difficult to obtain homogeneous mixed sols with weight ratios of $TiO_2/WO_3$ lower than 0.2.

However, for A.P.T., oxide ratios of 0.2 in the sols may be achieved without addition of extra acid.

In general, the sols and gels of this invention contain titanium and tungsten in a $TiO_2/WO_3$ weight ratio of at least 0.15. There is no critical maximum limit on this ratio, since the sols and gels are generally infinitely dilutable with titanium chloride. However, sols and gels in which the $TiO_2/WO_3$ weight ratio is greater than 20:1 may give rise to a metal carbide product which is not significantly different from titanium carbide.

Mixed sols have been prepared (Examples 19 and 11) by the addition of ammonium tungstate solution, containing a suspension of A.P.T., to $TiCl_4$ solution. Thus the formation of A.P.T. during the preparation of A.T.S. has no deleterious effect upon the sol formation.

The order of addition of reactants may be reversed but differences in the ease of sol formation have been observed. Thus, sols are more quickly and easily formed when $TiCl_4$ is added to A.T.S. at ambient temperatures than when A.T.S. is added to $TiCl_4$.

MIXED SOLS AND GELS FROM A.P.T. AND $TICL_4$ BY A HOT ROUTE

It is preferable that the titanium chloride is in a sufficiently high free acid concentration such that the $TiCl_4$ is not hydrolyzed to unpeptizable hydrated oxides.

The reactants may be heated in a closed vessel to 60° C. to 85° C. and maintained for short periods of time (about ½ to 1 hour) at this temperature. It is not considered essential to have reaction in a closed vessel except that in a closed system reproducible products are obtained since no constituents are lost by evaporation. Reactions can proceed in open vessels and losses of acid and water may be made up during the hot process.

It is considered desirable to maintain agitation or stirring during reaction so as to avoid local inhomogeneities of components which may lead to non-dispersible materials, e.g. $\alpha$-tungstic acid, in the resultant gels.

The temperature is not critical although high temperatures can lead to irreversible hydrolysis of chlorides and low temperatures lead to a slow reaction. A temperature of 75° C. is considered a reasonable compromise.

REACTANTS

Ammonium tungstates (i) Ammonium tungstate solution.—To obtain a clear ammonium tungstate solution it is convenient to add aqueous ammonia to a slurry of $\alpha$-tungstic acid in water. It is desirable to cool the reactants so as to prevent the formation of sparingly soluble paratungstates. The heat generated in the reaction makes it difficult to react concentrated aqueous ammonia and $\alpha$-tungstic acid without the formation of some paratungstate. Too low a concentration of ammonia also leads to paratungstate formation. In practice our ammonium tungstate solution has been prepared by reacting the materials in the following ratio. 120 ml. of cooled 8 Molar aqueous ammonia is added fairly quickly to a cooled slurry of 100 g. of tungstic acid cake (as received material contains 64.2 w/o $WO_3$) and 120 ml. of water. The resultant solution containing only traces of paratungstate ppt. contains 220 grams per litre of $WO_3$ and is 3.5 Molar with respect to $NH_3$.

(ii) Ammonium paratungstate (A.P.T.).—This material as received contains the equivalent of 89 w/o $WO_3$ and 5.48 w/o $NH_3$.

Titanium chloride solution

As received this solution is about 2.83 Molar in respect of titanium and the Cl/Ti ratio is about 4. Stronger solutions have been prepared by careful addition of anhydrous $TiCl_4$ to the above solution.

ADDITIONS

It has been shown previously that the addition of certain modifying additives, e.g. water-soluble starch products or other synthetic polymers with hydroxyl groups, imparts certain properties to precipitates generated in their presence. The precipitates tend to be of finer crystallite size and therefore more suitable for subsequent chemical reaction. A suitable modifying additive is a cationic modified starch, believed to contain amine groups, sold under the trade name Wisprofloc.

We have shown that the reaction of titanium chloride with $\beta$-tungstic acid or a tungstate can proceed in the presence or absence of protective additives although their presence may in certain instances be beneficial. Proportions of protective additives are not critical, but are generally not more than 5% by weight on the weight of the metal oxides.

TERNARY SYSTEMS

Other refractory metals, e.g., Ta, Nb, Cr, V or non-refractory metals, e.g. Co, Ca, Bi may be incorporated into the sol by any convenient means to confer additional desirable properties on the calcined final product. The metal may be added, for example, as a chloride at a convenient stage in the preparation of the sol. The proportion of such other metal is not critical, but is generally not more than 20% by weight of the titanium and tungsten.

ADDITION OF CARBON

The sol can be dried and calcined to give an intimately mixed oxide system.

However, a carbonaceous material, preferably finely divided carbon may be introduced at a convenient stage in the production of the sol before evaporation, or in the sol formed by redispersing the gel in water, to provide carbon for carbide formation during the carbothermic reaction. The carbon may be introduced as an aqueous dispersion or as a powder together with a suitable wetting agent with subsequent blending.

DRYING

For the production of uniformly stoichiometric carbide material it is desirable to maintain the homogeneity of the sol/carbon system during the removal of water by any conventional drying technique. For example, this can be achieved either by tray drying a viscous sol/carbon mixture to give a gel/carbon product which may then be crushed and ground, or by spray drying in which the water is rapidly removed to give directly a powder product of small particle size. If the spray drying is carried out at ca 400° C. the removal of the majority of the volatiles (e.g. ammonium chloride, water or any other similar salts or additives) is effected.

CARBOTHERMIC REDUCTIONS

In another aspect, the present invention provides a method of making a material comprising a mixed tungsten-titanium carbide, which method comprises calcining the gel whose preparation is described above in the presence of a carbonaceous material.

The carbonaceous material may be provided either in the form of a solid, e.g. finely divided carbon dispersed in the gel as described above, or in the form of a gas, e.g. methane or carbon monoxide, in contact with the gel. When a solid carbonaceous material is dispersed in the gel, calcination may be effected in vacuum, or in a non-oxidizing atmosphere, e.g. of argon, carbon monoxide, hydrogen or town gas, or a mixture thereof.

Calcination in vacuo or in inert atmosphere (either static or dynamic systems) requires a gel containing mixed metal oxides and carbon which react according to

$$TiO_2 + 3C \rightarrow TiC + 2CO \quad (1)$$

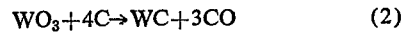
$$WO_3 + 4C \rightarrow WC + 3CO \quad (2)$$

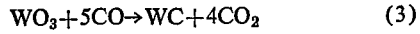
$$WO_3 + 5CO \rightarrow WC + 4CO_2 \quad (3)$$

The amount of carbon that is required may be determined empirically for a particular set of temperature and atmosphere conditions, factors which will probably determine the overall ratio of reactions (2) and (3), plus any allowance which must be made for any ternary metal present in the system.

Calcinations in carbonaceous atmospheres may use as feed materials either gels containing no carbon or gels containing carbon added in varying amounts up to a maximum corresponding to Equations 1 to 3. Any residual chloride in the gel feed is likely to promote carbide formation.

The carbothermic reduction of the $TiO_2/WO_3$ system is in two parts with the initial reduction occurring in the temperature range 800 to 950° C. and the second phase is largely complete in the temperature range 1100 to 1400° C., times of less than 2 hours being normally required for these reductions. The product of the reaction is substantially mixed carbide but we have found that higher temperatures (e.g. 1600° C. to 1800° C.) may be employed to yield products of lower oxygen content.

While the examples given are batch experiments, it is to be expected that the reactions would occur similarly in corresponding dynamic, e.g. fluidized, vacuum or countercurrent, reactor systems such as would normally be used on a larger scale.

The following examples illustrate the invention.

EXAMPLE 1

200 g. of calcium tungstate filter cake was slurried with 2 g. Wisprofloc W (a modified starch) in water, and added to a mixture of 300 ml. $TiCl_4$ solution (2.7 MTi), 350 ml. concentrated HCl, and 300 ml. water, and heated for 30 minutes at 90 to 95° C. when the mixture became a milky brown color. On allowing the mixture to stand a large volume of white precipitate settled out. The supernatant was decanted off, and water was added to the precipitate to bring the total volume to about 1.5l. The whole mixture immediately turned into a clear brown sol which could be evaporated at 50° C. to give a water-dispersible gel.

EXAMPLE 2

A sol and gel was prepared by adding a solution of tungstic acid cake (20 g.) in water containing concentrated aqueous $NH_4OH$ (8 ml.) to a mixture of $TiCl_4$ solution (50 ml.), concentrated HCl (50 ml.) and water (100 ml.) to which Wisprofloc W (0.25 g.) was added. The initial white precipitate of β-tungstic acid dissolved on warming the mixture to 70° C. to give a clear sol which was evaporated to a gel. The gel was redispersed in water to give a sol containing about 400 g. gel/l. Finely divided carbon was mixed with the sol in an amount sufficient to satisfy reactions (1) and (2) above. The mixture was evaporated at 55° C. to give a gel designated Gel 2C.

EXAMPLE 3

(a) Tungstic acid filter cake (200 g.) was dissolved in water (200 ml.) containing 80–100 ml. concentrated aqueous $NH_4OH$;

(b) The solution was mixed with a solution containing an excess of HCl (175 ml. in 400 ml. water) and Wisprofloc W (1 g.);

(c) The precipitated β-tungstic acid was separated from the supernatant by centrifugation, and washed with water;

(d) The filter cake was slurried in water (500 ml.) and added to a solution of $TiCl_4$ (500 ml. 2.7 MTi) containing Wisprofloc W (1 g.) and made up to a final volume of 3 l. and the mixture was warmed to 60 to 80° C. to give a clear solution;

(e) The solution was evaporated at 55° C. to a gel (about 280 g.) which was redispersible in water.

A portion of the gel prepared as described in Example 3 was redispersed in water to give a sol containing about 400 g. gel/l. Finely divided carbon was mixed with the sol to provide an amount sufficient to satisfy the reactions (1) and (2) above.

The mixture was evaporated at 55° C. to give a gel which was used for the carbothermic reduction experiments described later, designated Gel 3C.

Note: The above amounts will, if converted to carbide, give 50% WC/50% TiC by weight, assuming that the tungstic acid cake contained 50% $WO_3$ by weight.

Gels 2C and 3C were calcined under the conditions, and with the results, set out in Table I. The runs were carried out on a 10–20 g. scale. Examples 4, 6 and 7 were performed in a conventional tube furnace with the gels in shallow alumina boats. Example 5 was performed in a Stokes vacuum furnace using a graphite boat.

TABLE I.—PRODUCTS OBTAINED FROM CARBOTHERMIC REDUCTIONS OF MIXED TUNGSTEN-TITANIUM OXIDE GELS

| Ex. | Gel | Calculation | Time (hr.) | Phases present | | | | | | Physical appearance | Other remarks |
| --- | --- | --- | --- | --- | --- | --- | --- | --- | --- | --- | --- |
| | | | | (Ti, W) C | WC | $W_2C$ | W | $TiO_2$ | $WO_2$ | | |
| 4 | 2C | Argon, 1,150° | 6 | Yes | N.D. | Yes | Yes | N.D. | N.D. | Black sooty. | |
| 5 | 2C | Vacuum, 1,850° | 3 | Yes | N.D. | N.D. | Strong trace | N.D. | N.D. | Grey | Well crystalline solid solution (Ti, W) C. |
| 6A | 2C | Carbon monoxide, 650°. | 6 | N.D. | N.D. | N.D. | N.D. | Yes | N.D. | Black, sooty. | Diffuse X-ray pattern showing lines attributable to both rutile and anatase. |
| 6B | | Argon, 1,150° | 10 | Yes | N.D. | N.D. | Yes | N.D. | N.D. | ...do... | The product of Example 6A was used as feed material for Example 6B. |
| 7 | 3C | CO 850°/argon 1,150°. | 16/12 | Yes | Weak trace | Weak trace | Weak trace | N.D. | N.D. | Black | |

NOTE.—Yes indicates a majority phase; N.D.=Not detected.

EXAMPLE 8

145 g. of ammonium tungstate solution were mixed with 4 M HCl containing 1.5 g. W starch to give β-tungstic acid which was washed and added as a slurry to a $TiCl_4$ solution (ca. 163 g. $TiO_2$ equivalent) containing 1.5 g. W starch. The mixture in a volume of 4.2 l. was heated to 80° C. for 3 hours. A clear stable liquid was obtained.

EXAMPLE 9

6 g. of freshly precipitated β-tungstic acid was mixed with 6 ml. $TiCl_4$, 18.6 ml. conc. HCl and 0.1 g. W starch. The mixture was heated at 70 to 80° C. for 4 hours, cooled and diluted with water until a clear liquid was obtained.

A mixture of the sols from Examples 8 and 9 was evaporated to dryness at 50° C. The resulting gel was dissolved in the minimum amount of water to give a dark brown liquid with a total oxide composition of ca. 800 g./litre.

EXAMPLE 10

An ammonium tungstate solution was prepared by adding 83 mls. of 1:1 aqueous ammonia solution with stirring to a slurry of 95 g. α-tungstic acid cake (61.1 g. $WO_3$) in 100 mls. water. The ammonium tungstate solution was added with stirring to 200 mls. of cooled $TiCl_4$ solution (44.3 g. $TiO_2$ equivalent). The slurry was placed in a bottle, 100 ml. $H_2O$ added, and the mixture agitated at room temperature for 48 hours. A homogeneous yellow liquid was obtained with a $TiO_2/WO_3$ weight ratio of 0.725. A further 107 mls. $TiCl_4$ solution (23.7 g. $TiO_2$ equivalent) was readily mixed into the sol to give a $TiO_2/WO_3$ weight ratio of 1.11.

EXAMPLE 11

500 g. α-tungstic acid cake (321 g. $WO_3$ equivalent) was treated with 205 ml. concentrated aqueous ammonia in 400 ml. water to give an ammonium tungstate solution. This was added to 1620 ml. $TiCl_4$ solution (365 g. $TiO_2$ equivalent) and ca. 1.0 l. water. The whole was agitated for 48 hours and finally warmed at 50° C. for 2 hours to give 2.9 l. of homogeneous liquid with a $TiO_2/WO_3$ weight ratio of 1.14. A homogeneous sol/carbon mixture was prepared by rolling for 24 hours 2 l. of sol with 155.2 g. granular carbon black (94.9% of theoretical) and 3.0 g. polyvinyl alcohol. The sol/carbon mixture was spray dried at 400° C. to give a product with a particle size range of 1–14μ and a 2.0 w/o volatile content. A sample was carboethermically reduced in a vacuum furnace to a temperature of 1600° C. over 5 hours to give a friable mixed carbide product with a total carbon content of 11.18 w/o free carbon content 0.02 w/o and an oxygen content of 0.43 w/o.

EXAMPLE 12

497 ml. $TiCl_4$ solution (110.1 g. $TiO_2$ equivalent) was added to 110 g. solid ammonium paratungstate and briefly agitated, 300 ml. water was then added and the whole agitated for 48 hours. A further 650 mls. water was added to give a clear liquid with a $TiO_2/WO_3$ weight ratio of 1.13. 73.8 g. (105% of theoretical) carbon black and 1.6 g. polyvinyl alcohol were added and rolled for 24 hours. A portion of this was spray dried at 105° C. to give a product with a particle size of 1–20μ. A sample was carbothermically reduced in a vacuum furnace to 1650° C. over 4.5 hours to give a final mixed carbide product with a total carbon content of 15.3 w/o, free carbon content 3.28 w/o and an oxygen content of 0.15 w/o.

EXAMPLE 13

75 ml. $TiCl_4$ solution (16.9 g. $TiO_2$ equivalent) was added to 75 g. ammonium paratungstate (66.8 g. $WO_3$ equivalent) together with 75 ml. concentrated HCl. This was heated at 75° C. for 30 minutes, cooled and diluted with 650 ml. water to give a white opalescent liquid with a $TiO_2/WO_3$ weight ratio of 0.253.

EXAMPLE 14

20 g. of ammonium paratungstate together with 5.31 g. tantalum pentachloride and 40 ml. $TiCl_4$ were heated with agitation at 75° C. for 30 minutes. The cooled product, which consisted of an opalescent solid, was dispersed in 80 ml. water to give a slightly milky opalescent liquid.

EXAMPLE 15

3.0 g. $TaCl_5$ were added to 29.9 mls. $TiCl_4$ solution and agitated for 24 hours to give a clear yellow mixture. To 6.25 ml. of ammonium tungstate solution containing 0.16 g. $WO_3$/ml. was added 3.8 ml. of the Ta/Ti chloride mixture and agitated for 5 days. A slightly translucent liquid was obtained with a nominal composition if carbothermically reduced to the carbide of 38 w/o Ti, 50 w/o W and 12 w/o Ta.

EXAMPLE 16

To 3.8 ml. of Ta/Ti chloride mixture was added 1.12 g. ammonium paratungstate and agitated for 3 days to give an almost clear liquid with the same metal ratio as in Example 15.

EXAMPLE 17

A mixture, comprising 25 g. ammonium paratungstate, 25 ml. of titanium chloride solution, 7.5 ml. of concentrated hydrochloric acid, and 17.5 ml. of water, was heated with agitation in a closed container. The temperature was raised to 75° C. and maintained at 75° C. for 60 minutes. The cooled product, which consists of a very thick cream, was agitated with 200 ml. of water to give a homogeneous viscous thixotropic liquid containing the equivalent of 110 g. per litre of total metal oxides ($TiO_2$ and $WO_3$). The ratio of the weight of $TiO_2$ to the weight of $WO_3$ is 0.253.

EXAMPLE 18

A mixture, comprising 40 g. ammonium paratungstate and 80 ml. of titanium chloride, solution, was heated with agitation in a closed container. The temperature was raised to 75° C. and maintained at 75° C. for 30 minutes. The cooled product, which consisted of an opalescent solid, was dispersed in 175 ml. water to give a mobile slightly opalescent liquid containing the equivalent of 210 g. per litre of total metal oxides ($TiO_2 + WO_3$). The ratio of weights of $TiO_2/WO_3$ is 0.506.

EXAMPLE 19

100 g. α-tungstic acid cake (64.2 g. $WO_3$ equivalent) was treated with 100 ml. 10 N aqueous ammonia in 200 ml. water to give an ammonium tungstate solution. 315 g. $TiCl_4$ solution (70.8 g. $TiO_2$ equivalent) was added to this to give a total volume of 720 ml. and agitated at room temperature for 48 hours to give a final product with a density of 1.23 g./ml. and a $TiO_2/WO_3$ weight ratio of 1.10. A homogeneous sol/carbon mixture was prepared by rolling for 24 hours with 47.8 g. granular carbon black (105% stoichiometric) and 1.6 g. polyvinyl alcohol. The sol/carbon mixture was spray dried at 400° C. A sample was carbothermically reduced in a vacuum furnace to a temperature of 1650° C. over 5 hours to give a product with a total carbon content of 14.3 w./o., free carbon content 1.92 w./o. and an oxygen content of 0.20 w./o.

EXAMPLES 20 TO 25

Further experiments were carried out along the lines of Example 19, admixture and equilibration being effected in all cases at ambient temperatures. Details and results are set out in Table II below.

EXAMPLES 26 TO 30

Further experiments were carried out along the lines of Example 12, ammonium paratungstate being equilibrated with titanium tetrachloride solution at ambient temperature. Details and results are set out in Table III below.

EXAMPLE 31

A mixture, comprising 10 g. of ammonium paratungstate and 45 ml. of titanium chloride solution, was heated with agitation in a closed container. The temperature was raised to 75° C. and maintained for 180 minutes. The cooled product, which was a thick cream, was dispersed in 75 ml. of water to give a viscous opalescent liquid containing the equivalent of 230 g. per litre of total metal oxides ($TiO_2 + WO_3$). The weight ratio of $TiO_2/WO_3$ is 1.138.

sten and titanium which process comprises adding a liquid comprising titanium tetrachloride to an aqueous solution of a metal or ammonium tungstate to form an aqueous sol or gel having a weight ratio of $TiO_2:WO_3$ of at least 0.15.

2. A process as claimed in claim 1 wherein the tungstate is ammonium tungstate.

3. A process as claimed in claim 1 wherein up to 20% by weight of tungsten and titanium of a refractory or nonrefractory metal other than tungsten and titanium in the form of a salt of said other metal is incorporated into the sol or gel.

4. A process as claimed in claim 1 wherein a carbonaceous material is included in the sol or gel.

5. A process as claimed in claim 1 wherein the titanium and tungsten are used in a $TiO_2/WO_3$ weight ratio of at least 0.2.

6. A process as claimed in claim 1 wherein the molar ratio of anion/titanium in the mixture is at least 1.0, and the molar concentration of anion is not greater than 7.0.

7. A method of making a material comprising a mixed titanium-tungsten carbide which method comprises:
 (a) forming an aqueous redispersible gel or a dilutable sol convertible into a redispersible gel of mixed tungsten and titanium oxides by adding a liquid comprising titanium tetrachloride to an aqueous solution of a metal or ammonium tungstate so as to form an aqueous sol or gel having a weight ratio of $TiO_2$ to $WO_3$ of at least 0.15,
 (b) if necessary removing water from the sol to form an aqueous tungsten-titanium gel, and
 (c) calcining the gel at a temperature of at least 800° C. in the presence of at least sufficient carbonaceous reducing agent to permit formation of a mixed titanium-tungsten carbide.

8. A method as claimed in claim 7 wherein the carbonaceous material is finely divided carbon dispersed in the sol or gel.

9. A method as claimed in claim 7 wherein the carbonaceous material is a gas in contact with the sol or gel.

10. A process for preparing an aqueous acidic redispersible gel or stable dilutable sol containing a substantially homogenous mixture of tungstic and titanic oxides

TABLE II

| Ex. | A.T.S. vol. (ml.) | Aq. $TiCl_4$ vol. (ml.) | Conc. HCl vol. (ml.) | Water vol. (ml.) | Order of addition | Wt. $TiO_2$/wt. $WO_3$ | Approx. conc. of Total oxide (g./l.) | Molarity of acid chloride | Appearance of sol |
|---|---|---|---|---|---|---|---|---|---|
| 20 | 5.0 | 5.0 | 0 | 5.0 | A.T.S., $H_2O$, $TiCl_4$ | 1.02 | 150 | 2.5 | Clear liquid, no precipitate. |
| 21 | 5.0 | 1.7 | 3.3 | 5.0 | A.T.S., $H_2O$, $TiCl_4$ + HCL | 0.35 | 100 | 2.6 | Viscous translucent liquid, homogeneous. |
| 22 | 5.0 | 1.0 | 4.0 | 5.0 | A.T.S., $H_2O$, $TiCl_4$ + HCL | 0.20 | 90 | 2.6 | Milky liquid containing white precipitate. |
| 23 | 5.0 | 6.0 | 0 | 4.0 | A.T.S., $H_2O$, $TiCl_4$ | 1.23 | 160 | 3.2 | Clear liquid, no precipitate. |
| 24 | 5.0 | 8.0 | 0 | 2.0 | A.T.S., $H_2O$, $TiCl_4$ | 1.64 | 190 | 4.7 | Clear liquid, trace precipitate. |
| 25 | 5.0 | 10.0 | 0 | 0 | A.T.S., $TiCl_4$ | 2.04 | 220 | 6.2 | Milky liquid containing white precipitate. |

TABLE III

| Example | Wt. of A.P.T. (g.) | Vol. of Aqueous $TiCl_4$ (ml.) | Vol. of Conc. HCl (ml.) | Vol. of Water (ml.) | Wt. of $TiO_2 + WO_3$ (g.) | Approx. conc. of total oxide (g./l.) | Mole ratio of acid Cl'/Ti | Molarity of acid Cl' | Wt. $TiO_2$/Wt. $WO_3$ | Appearance of homogeneous material |
|---|---|---|---|---|---|---|---|---|---|---|
| 26 | 1.00 | 5.00 | 0 | 8.00 | 2.02 | 150 | 3.8 | 4.1 | 1.264 | Clear liquid. |
| 27 | 1.00 | 2.00 | 0 | 6.00 | 1.34 | 170 | 3.4 | 2.4 | 0.506 | Do. |
| 28 | 1.00 | 1.00 | 0 | 2.00 | 1.12 | 360 | 2.9 | 2.6 | 0.253 | Opalescent solid. |
| 29 | 1.00 | 1.50 | 0.50 | 2.00 | 1.23 | 300 | 4.6 | 4.8 | 0.380 | Creamy solid. |
| 30 | 5.00 | 5.00 | 0 | 5.00 | 5.58 | 540 | 2.9 | 3.9 | 0.253 | Opalescent solid. |

We claim:

1. A process for preparing an aqueous, redispersible gel or an aqueous, stable, dilutable sol containing tungsten which process comprises hydrolyzing an insoluble tungstate or β-tungstic acid with hot mineral acid in the presence of an aqueous solution of titanium tetrachloride to form a sol or a gel having a weight ratio of $TiO_2$ to $WO_3$ of at least 0.15.

11. A process as claimed in claim 10 wherein insoluble tungstate is ammonium paratungstate.

12. A process as claimed in claim 10 wherein up to 20% by weight on the weight of tungsten and titanium of a refractory or nonrefractory metal other than tungsten and titanium in the form of a salt of said other metal is incorporated into the sol or gel.

13. A process as claimed in claim 10, wherein a carbonaceous material is included in the sol or gel.

14. A process as claimed in claim 10 wherein the titanium and tungsten are used in a $TiO_2/WO_3$ weight ratio of at least 0.2.

15. A process as claimed in claim 10, wherein the molar ratio of anion/titanium in the mixture is at least 1.0, and the molar concentration of anion is not greater than 7.0.

16. A method of making a material comprising a mixed titanium tungsten carbide which method comprises:
   (a) forming an aqueous re-dispersible gel or a stable dilutable sol convertible into a reversible gel by hydrolyzing an insoluble tungstate or β-tungstic acid with hot mineral acid in the presence of an aqueous solution of titanium tetrachloride such that the sol or gel has a weight ratio of $TiO_2$ to $WO_3$ of at least 0.15,
   (b) if necessary, removing water from the sol to form an aqueous gel of mixed tungstic and titanic oxides and
   (c) calcining the gel at a temperature of at least 800° C. in the presence of at least sufficient carbonaceous reducing agent to permit formation of a mixed titanium-tungsten carbide.

17. A method as claimed in claim 16 wherein the carbonaceous material is finely divided carbon dispersed in the sol or gel.

18. A method as claimed in claim 16 wherein the carbonaceous material is a gas in contact with the sol or gel.

References Cited
UNITED STATES PATENTS

| | | | |
|---|---|---|---|
| 2,694,049 | 11/1954 | Reynolds et al. | 252—317 X |
| 1,682,239 | 8/1928 | Patrick | 252—317 X |
| 1,868,565 | 7/1932 | Connolly | 252—446 |
| 3,375,073 | 3/1968 | McMullen | 264—.5 X |
| 3,171,715 | 3/1965 | Kleinsteuber | 252—301.1 S X |
| 1,683,695 | 9/1928 | Patrick et al. | 252—317 X |
| 2,289,104 | 7/1942 | Dawihl et al. | 106—43 |

RICHARD D. LOVERING, Primary Examiner

U.S. Cl. X.R.

106—55, 56; 252—306, 309, 313 R, 317